United States Patent
Fulcher et al.

(10) Patent No.: US 9,531,290 B2
(45) Date of Patent: Dec. 27, 2016

(54) CONTROLLING PARALLEL CONVERTER SYSTEMS FOR WIND TURBINES

(71) Applicant: Siemens Aktiengesellschaft, Munich (DE)

(72) Inventors: Robert Vernon Fulcher, Stoke on Trent (GB); Paul Godridge, Cheadle (GB); Joseph Hartley, Crewe (GB); Rodney Jones, Stoke on Trent (GB); Fan Yue, Burton on Trent (GB)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/752,965

(22) Filed: Jun. 28, 2015

(65) Prior Publication Data

US 2016/0043651 A1 Feb. 11, 2016

(30) Foreign Application Priority Data

Jul. 2, 2014 (EP) .................................. 14175430

(51) Int. Cl.
*H02M 7/493* (2007.01)
*H02M 7/04* (2006.01)
(Continued)

(52) U.S. Cl.
CPC ............... *H02M 7/04* (2013.01); *F03D 9/002* (2013.01); *H02M 7/44* (2013.01); *H02M 7/493* (2013.01);
(Continued)

(58) Field of Classification Search
CPC ........ H02M 7/04; H02M 7/422; H02M 7/493; H02M 7/77; H02M 7/81; H02M 2007/4822; H02M 5/458
(Continued)

(56) References Cited

U.S. PATENT DOCUMENTS 8,902,616 B2 * 12/2014 Royak .................... H02M 1/32
363/37
2001/0015904 A1 * 8/2001 Kimura ................. H02M 7/538
363/131

(Continued)

FOREIGN PATENT DOCUMENTS

EP 0809347 A2 11/1997

OTHER PUBLICATIONS

Jones R. et al.: "Optimised Power Converter for Multi-MW Direct Drive Permanent Magnet Wind Turbines"; Proceedings of the 2011-14th European Conference on Power Electronics and Applications (EPE 2011); pp. 1-10; ISBN: 978-1-61-284167-0; XP055160351; 2011.

*Primary Examiner* — Gary L Laxton
*Assistant Examiner* — Kyle J Moody
(74) *Attorney, Agent, or Firm* — Beusse Wolter Sanks & Maire

(57) ABSTRACT

A method of controlling a power unit having a plurality of converter modules coupled in parallel, is configured to convert DC into AC voltages or AC into DC voltage. The method includes (a) receiving a control value for each phase of each converter module, (b) obtaining a set of phase current values for each converter module, (c) generating a compensation value for each phase of each converter module based on the set of phase current values and a set of stored data, the set of data representative of non-linearity characteristics of the converter modules as functions of phase current value, (d) generating a compensated control value for each phase of each converter module based on the corresponding control value and compensation value, and (e) supplying the compensated control values to the respective converter modules. A controller, power unit, wind (Continued)

turbine, computer program and computer program product are similarly configured.

12 Claims, 4 Drawing Sheets

(51) Int. Cl.
*H02M 7/77* (2006.01)
*H02M 7/81* (2006.01)
*F03D 9/00* (2016.01)
*H02M 7/44* (2006.01)
*H02M 7/48* (2007.01)

(52) U.S. Cl.
CPC ............ *H02M 7/77* (2013.01); *H02M 7/81* (2013.01); *H02M 2007/4822* (2013.01); *Y02E 10/76* (2013.01)

(58) Field of Classification Search
USPC ........................... 363/34, 35, 37, 131
See application file for complete search history.

(56) References Cited

U.S. PATENT DOCUMENTS

| | | | |
|---|---|---|---|
| 2005/0047182 A1* | 3/2005 | Kraus | H02M 7/493 363/71 |
| 2010/0188135 A1* | 7/2010 | Keronen | H02M 7/493 327/482 |
| 2013/0300491 A1* | 11/2013 | Boe | H01H 9/548 327/365 |
| 2014/0028239 A1 | 1/2014 | Hart et al. | |

* cited by examiner

CONTROLLING PARALLEL CONVERTER SYSTEMS FOR WIND TURBINES

CROSS REFERENCE TO RELATED APPLICATIONS

This application claims the benefit of European Application No. EP14175430 filed Jul. 2, 2014 incorporated by reference herein in its entirety.

FIELD OF INVENTION

The present invention relates to the field of power converter systems for wind power generators, in particular to a method of controlling a power unit comprising a plurality of parallel converters, a controller for a power unit comprising a plurality of parallel converters, a power unit and a wind turbine comprising such a controller, and a computer program and a computer program product.

ART BACKGROUND

When converter modules, i.e. voltage source inverters or rectifiers, are paralleled via a sharing reactor, the different turn on and off delays, voltage rise/fall and on voltage drop of the semiconductors may introduce current divergence. If each converter device is of the same type, i.e. with the same gate drive circuit, this difference is relatively small as the tolerances are normally kept within a tight range with modern process control. To further balance current differences caused by variations within the tolerances, a closed-loop current sharing algorithm (active sharing) is normally used. There are two major active sharing approaches: (1) modification of the individual converter module voltage demand or (2) the output pulse width.

Taking active sharing based on modification of voltage demand as an example, the primary purpose is to take the 3 phase modulation set, Vabc, which the (network or generator) current controller has demanded, and produce several variations of this Vabc as outputs, where each output is then used to calculate the PWM edge times for an individual converter module. The difference between the input Vabc and each of the outputs is determined by the difference between the current feedbacks for that converter module, compared with the average current feedback. Thus, this technique is intended to provide a means of balancing the currents in each converter module, and should compensate for the natural unbalancing effects of variations of timings and impedances in each individual converter module. FIG. 1 shows a block diagram of a corresponding controller for one of the phases of a converter module.

A state of the art power unit (such as a 3 MW power unit for a wind power generator from Siemens Wind Power (SWP)) comprises five parallel converter modules. Each module contains the same IGBT module type and so the same semi-conductor variant. The above mentioned active sharing algorithm can improve the mis-share current from around 6% without active sharing to less than 3%. The mis-share current is the difference between the individual RMS current of one of the converter modules and the average current of all five modules. The SWP converter module is a two level voltage source converter using IGBTs with anti-parallel diodes as switching devices. Further details about the SWP power unit and converter module design can e.g. be found in the following paper: Jones, Rod; Waite, Philip (2011) "Optimised power converter for multi-MW direct drive permanent magnet wind turbines", Proceedings of $14^{th}$ EPE.

However, when the converter modules use different types of semiconductors and gate drive circuits, e.g. if one converter module of one type is replaced by a new converter module of another (e.g. newer) type or if converter modules originating from different suppliers are coupled in parallel, the non-linearity characteristics may be so different that the traditional active sharing algorithm cannot stably and effectively balance the currents. As a consequence, the total converter rating has to be degraded. Otherwise the converter may be thermally overloaded, resulting in reduced device life time or even damage. For example, if one SWP version 2 converter module was arranged in a parallel configuration with four version 1 modules within one SWP 3 MW power unit, then the mis-share would likely be around 15%. Consequently, a 15% de-rating of the power unit would have to be requested.

Accordingly, there may be a need for a way of reducing the mis-share current in a power unit comprising multiple converter modules of different types, such that the above-mentioned de-rating of the power unit can be avoided or at least significantly reduced.

SUMMARY OF THE INVENTION

This need may be met by the subject matter according to the independent claims. Advantageous embodiments of the present invention are set forth in the dependent claims.

According to a first aspect of the invention there is provided a method of controlling a power unit comprising a plurality of converter modules coupled in parallel, each converter module being configured to convert a DC voltage into AC voltages or AC voltages into a DC voltage. The method comprises (a) receiving a control value for each phase of each converter module, (b) obtaining a set of phase current values for each converter module, (c) generating a compensation value for each phase of each converter module based on the set of phase current values and a set of data stored in a memory, the set of data being representative of non-linearity characteristics of the converter modules as functions of phase current value, (d) generating a compensated control value for each phase of each converter module based on the corresponding control value and the corresponding compensation value, and (e) supplying compensated control values to the respective converter modules.

This aspect of the invention is based on the idea that a feed-forward compensation is applied to the control value for each phase of each converter module in order to compensate for individual non-linearity characteristics of the corresponding converter modules. More specifically, the compensation is performed by generating a compensation value for each phase of each converter module based on the corresponding phase current and a set of data that is representative of the non-linearity characteristics of the corresponding converter module as functions of the phase current.

Thereby, by applying feed-forward compensation to the control values for each converter module in dependency of the individual non-linearity characteristics of the converter modules, the currents in the converter modules may be well balanced even when the converter modules are of different types, i.e. when converter modules of different technology generations or from different manufacturers are coupled in parallel.

In the present context, the term "control value" may in particular denote a value indicative of a result to be provided by an individual converter module, such as a phase voltage demand value or a phase output pulse width.

The control values may in particular be received from a control system adapted to control the power unit with the aim of delivering a particular total output.

The set of phase current values for each converter module may in particular be obtained based on current measurements performed for each phase of each converter module.

The compensation values for each phase of each converter module may in particular be generated as respective values to be added (with sign) to the corresponding received control values in order to generate compensated control values that, when supplied to the corresponding converter modules, cause the respective converter module phases to deliver an output contribution that is closer to that expected by the control algorithm supplying the uncompensated control values.

The topology of the converter modules may include three-level, cascaded multi-cell converter, etc. voltage source converter types.

According to an embodiment of the invention, the set of data is representative of non-linearity characteristics of the converter modules as functions of phase current value and control value, and the step of generating the compensation value for each phase of each converter module is further based on the set of phase current values.

In other words, the non-linearity characteristics are stored as a function of two variables: phase current value and control value.

Thereby, variations in the non-linearity characteristics caused by varying operating conditions, i.e. by varying control values, as well as by varying phase currents can be taken into account, such that a feed-forward compensation with high precision is obtained.

According to a further embodiment of the invention, the set of data is stored in a look-up table or as a set of curve-fitted equations.

Whether the set of data is stored as a look-up table or as a set of curve-fitted equations may depend on the circumstances, such as available memory and processing resources in the control system.

In the case of a look-up table, interpolation may be applied to obtain compensation values lying between values in the table.

The look-up table may be stored in the form of one look-up table for each phase of each converter module, or as one large look-up table with additional indexes identifying phase and converter module.

The look-up table may be a 2D or a 3D look-up table with phase current and/or control value as index(es).

According to a further embodiment of the invention, the set of data is obtained from test data.

In particular, the set of data may be obtained during a burn-in test performed during manufacture of the individual converter modules.

According to a further embodiment of the invention, the set of data is obtained and/or updated during operation of the power unit.

In particular, the set of data may be obtained or updated during startup of the power unit.

According to a further embodiment of the invention, the set of data is obtained and/or updated by calculating, for each phase of each converter module, a feedback current error and a corresponding control value compensation value, and storing the calculated control value compensation value together with the corresponding phase current value.

In other words, the set of data is obtained or updated by means of a closed-loop system based on the feedback current error. The control value compensation values are thus essentially calculated in the same way as in the known current-sharing approach described in the introduction.

It should be noted that the feedback system of this embodiment may also be used to compensate small residual inaccuracies in the phase currents, i.e. in combination with the feed-forward compensation of the first aspect and above embodiments.

According to a further embodiment of the invention, the non-linearity characteristics of the converter modules comprise switching-related errors and/or on-state voltage drops relating to semiconductor components in the converter modules.

The switching related error is caused by delay between command and semiconductor switching and the associated dynamics of voltage rise/fall.

The on-state voltage drop is the voltage drop across the semiconductor component when the component is biased to the conducting state.

The semiconductor components may comprise diodes, IGBT, IGCT, IEGT, MOSFET, JFET, GTO, MCT, etc.

According to a second aspect of the invention, there is provided a controller for a power unit comprising a plurality of converter modules coupled in parallel, each converter module being configured to convert a DC voltage into AC voltages or AC voltages into a DC voltage. The controller comprises (a) a unit for receiving a control value for each phase of each converter module, (b) a unit for obtaining a set of phase current values for each converter module, (c) a unit for generating a compensation value for each phase of each converter module based on the set of phase current values and a set of data stored in a memory, the set of data being representative of non-linearity characteristics of the converter modules as functions of phase current value, (d) a unit for generating a compensated control value for each phase of each converter module based on the corresponding control value and the corresponding compensation value, and (e) a unit for transmitting the compensated control values to the respective converter modules.

This aspect is essentially based on the same idea as the first aspect described above. In particular, the second aspect constitutes a controller adapted to perform the method of the first aspect or any of the above embodiments.

The units may be functional units implemented in hardware and/or software.

According to a third aspect of the invention, there is provided a power unit for a wind turbine generator. The power unit comprises (a) a plurality of converter modules coupled in parallel, each converter module being configured to convert a DC voltage into AC voltages or AC voltages into a DC voltage, and (b) a controller according to the second aspect.

This aspect is essentially based on the same idea as the first and second aspects described above.

According to a fourth aspect of the invention, there is provided a wind turbine comprising a power unit according to the third aspect.

The wind turbine according to this aspect may be relatively cheap to manufacture and maintain since various converter modules may be used without consideration to the other converter modules. In other words, a defective converter module may be replaced by a new one that may be cheaper than the original one. Similarly, converter units from different suppliers may be used, which may have a beneficial influence on total costs.

According to a fifth aspect of the invention, there is provided a computer program comprising computer executable instructions adapted to, when executed by a computer processing unit, cause the computer to perform the method according to the first aspect or any of the above embodiments.

The computer program may replace a corresponding control program running on a control system and thereby implement the advantageous functionality of the present invention without the need for additional hardware.

According to a sixth aspect of the invention, there is provided a computer program product comprising a computer readable data carrier loaded with a computer program according to the preceding paragraph.

It is noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular to combinations of features of the method type claims and features of the apparatus type claims, is part of the disclosure of this document.

The aspects defined above and further aspects of the present invention are apparent from the examples of embodiments to be described hereinafter and are explained with reference to the examples of embodiments. The invention will be described in more detail hereinafter with reference to examples of embodiments. However, it is explicitly noted that the invention is not limited to the described exemplary embodiments.

DETAILED DESCRIPTION

Figure 1:
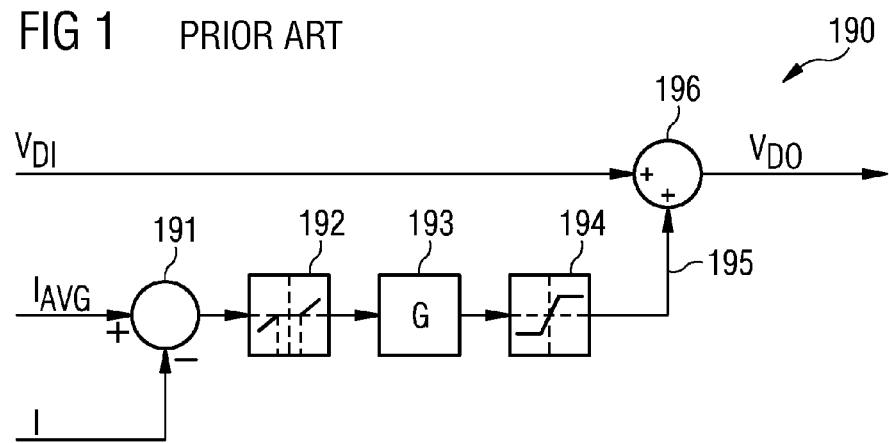
FIG. 1 shows a block diagram of a closed-loop current sharing control system for a converter module in accordance with the prior art.

The illustration in the drawing is schematic. It is noted that in different figures, similar or identical elements are provided with the same reference numerals or with reference numerals which differ only within the first digit.

FIG. 1 shows a block diagram of a closed-loop current sharing control system 190 for a converter module in accordance with the prior art. The converter module is one of a number of converter modules coupled in parallel. Only the part of the system relating to one single phase is shown. More specifically, the system 190 comprises a subtracting unit 191 that receives the average current $I_{AVG}$ for the corresponding phase in all the converter modules and the phase current I in the relevant converter module. The subtracting unit 191 outputs a corresponding current error ($\Delta I = I_{AVG} - I$) to a deadband unit 192 that only lets current error values through that have a magnitude above a predetermined threshold value. A gain is applied to the output from the deadband unit 192 by a gain unit 193 and the corresponding output is fed to a saturation unit or limiter 194 that limits the resulting voltage correction to a predetermined range. The final feedback compensation output 195 is representative for the current error, i.e. the difference between the average current $I_{AVG}$ and the phase current in the converter module, or in other words it is representative for an amount of correction that is to be applied to a corresponding control value that determines the current output from the converter module. Thus, the feedback compensation output 195 is fed to adder unit 196 where it is added to the phase voltage demand input value $V_{DI}$. The result is a compensated phase voltage demand output value $V_{DI}$ that can be fed to the converter module. In short, the closed-loop system 190 operates to bring the phase current I in the converter module as close as possible to the average current $I_{AVG}$ in all the converter modules such that balanced operation can be achieved where all converter modules produce approximately the same output current (shared current).

Figure 2A:
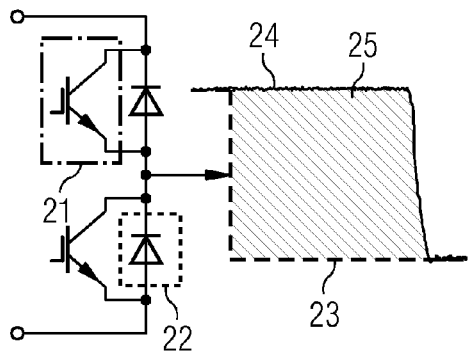
FIGS. 2A-2D illustrate various errors occurring during different stages of converter module operation.
Figure 2B:
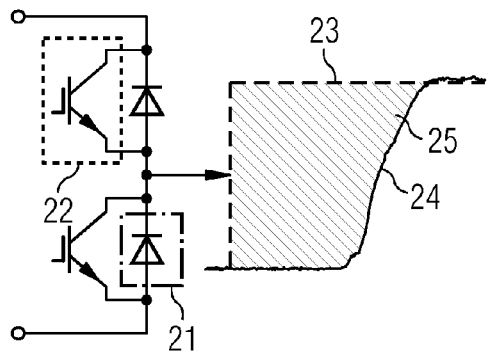
Figure 2C:
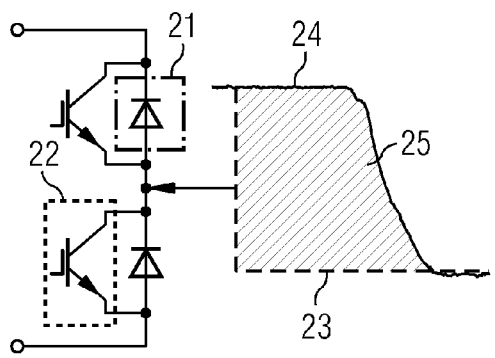
Figure 2D:
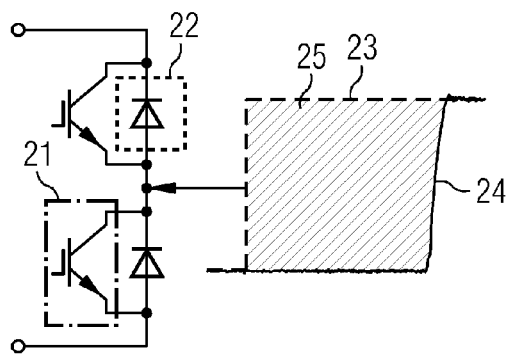

FIGS. 2A-2D illustrate various errors occurring during different stages of converter module operation. More specifically, the semiconductor components (IGBTs and anti-parallel diodes) of one half-bridge and a plot of expected and actual output voltage are shown in four situations a), b), c), and d) in which the output current commutates between top and bottom semiconductor components in the half bridge. More specifically, the four situations are:

a) top IGBT (MOSFET, IGCT, IEGT, etc) to bottom diode (FIG. 2A),
b) bottom diode to top IGBT (MOSFET, IGCT, IEGT, etc) (FIG. 2B),
c) top diode to bottom IGBT (MOSFET, IGCT, IEGT, etc) (FIG. 2C),
d) bottom IGBT (MOSFET, IGCT, IEGT, etc) to top diode (FIG. 2D).

In all four diagrams, the first (relative to the direction of commutation) semiconductor component is indicated as 21 and surrounded by a box of alternating dots and dashes, while the second semiconductor component is indicated as 22 and surrounded by a dotted line. To the right of each diagram, the expected output voltage 23 and the actual output voltage 24 are shown as a function of time. The corresponding volt-second error (resulting from the difference between actual and expected output voltage) is indicated as the area 25 between the two curves.

As can be seen, the commutations of bottom to top devices (i.e. situations a) and c)) generally introduce a volt-second loss between commanded output requirement and the achieved phase voltage to some arbitrary reference point (dc midpoint for example), while top to bottom device commutations (i.e. situations b) and d)) end up with a volt-second gain.

Figure 3:
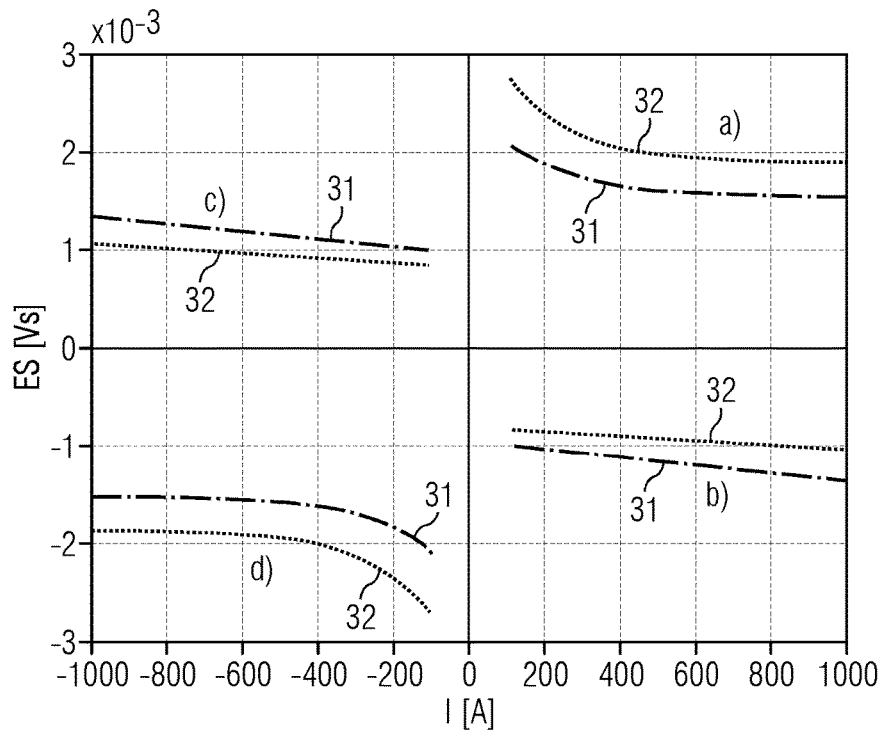
FIG. 3 shows a graphical representation of the errors illustrated in FIG. 2 as functions of output current

FIG. 3 shows a graphical representation of the errors illustrated in FIG. 2 as functions of output current. More specifically, FIG. 3 is a four quadrant plot of half bridge switching volt-second error against the load current. There are two sets of curves 31, 32 and each set of curves represents the non-linearity characteristics of one device type. Those two device types could be used in two converter modules which may be paralleled with each other. The data sets can be obtained in various ways (as discussed further below) and can be implemented for independent feed-forward compensation. The data sets may be stored in a computer system, e.g. as curve-fitted equations or look-up tables.

Figure 4:
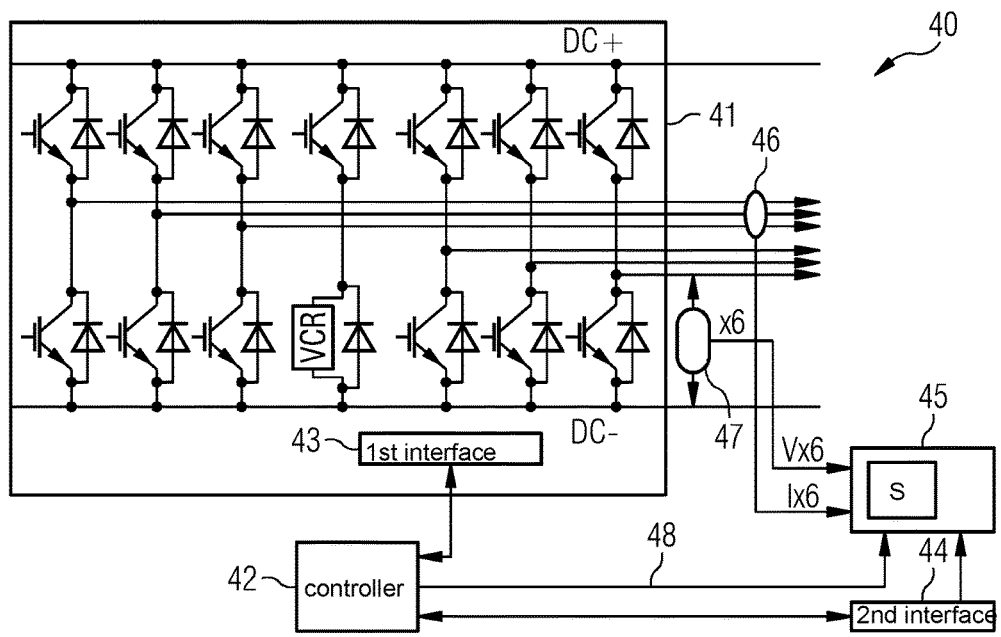
FIG. 4 shows block diagram of a measurement setup for measuring non-linearity characteristics of converter modules in accordance with an embodiment of the present invention.

FIG. 4 shows block diagram of a measurement setup 40 for measuring non-linearity characteristics of converter modules in accordance with an embodiment of the present invention. More specifically, the measurement setup 40 may be used to obtain the switching related errors by conducting a pulse test or burn-in test, etc. To calculate the volt-second error the gate command, the current and the device voltage have to be recorded. It is recommended to test in a mode which may be subsequently paralleled in power unit under the same conditions. The setup 40 comprises a full back-back converter 41, a controller 42, a first interface board 43, a second interface board 44, a scope 45, current probes 46 for measuring the phase currents I, voltage probes 47 for measuring the phase voltages V, and a trigger line 48. The purpose of the interface boards is to convert the control command to gate on/off signal. More specifically, the first interface board 43 controls the converter module under test while the second interface board 44 provides the synchronised gate logical signal for the non-linearity characterisation.

Figure 5:
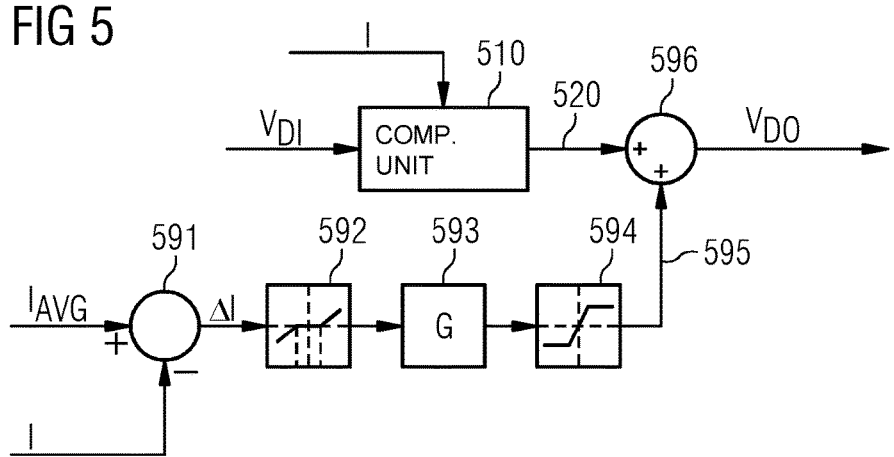
FIG. 5 shows a principal block diagram of a converter module controller in accordance with the present invention.

FIG. 5 shows a principal block diagram of a converter module controller in accordance with the present invention. Different from the known closed-loop system, the controller of the present invention applies feed-forward compensation to the control value $V_{DI}$ in order to take specific non-linearity characteristics of the particular converter module into account. More specifically, as shown in FIG. 5, a feed-forward compensation unit 510 generates a compensated control value 520 in dependency of converter module current I and voltage demand input $V_{DI}$.

The system shown in FIG. 5 further comprises a closed-loop compensation to take care of additional compensation. However, this is not essential for the invention which relates to individual feed-forward compensation of the converter modules. Thus, the lower part of the block diagram of FIG. 5 corresponds to the known current sharing discussed above in conjunction with FIG. 1, such that a corresponding discussion will be omitted here for reasons of brevity. The incorporation of the prior art method with the algorithm described allows remaining current imbalance arising from production variances of the different power semiconductor types to be further minimized.

The controller shown in FIG. 5 uses the approach of modifying the voltage demands VDI for each phase based on the non-linearity characteristics. Another approach could be to e.g. shift the device on/off edges. The latter approach is equivalent to the approach discussed in detail here and results in similar compensation performance.

With the shown approach, i.e. voltage demand change, the primary purpose is to take the (network or generator) current controller 3 phase modulation demand and produce several variations of this as outputs, where each output is then used to calculate the PWM edge times for an individual converter module. The difference between the input $V_{DI}$ and each of the outputs comprise two parts: one is feed-forward and the other is active sharing. The feed-forward part is determined by the feed-forward compensation unit 510 based on the converter module current I and converter module non-linearity characteristics. The non-linearity characteristics can be calculated based on curve-fitted equations or look-up tables representative of the data discussed above in conjunction with FIGS. 2 to 4.

The equations for the compensation calculation are shown in the following:

The idealised single phase average output is (when the current is positive) equal to $$\frac{Vdc}{2} \times M, \quad \text{(Equation 1)}$$

where M is the single phase instantaneous modulation index.

Due to non-linearity, the actual output is $$\left[\frac{\left(\frac{Vdc}{2} - Vce\right) \times (1+M')}{2}\right] + \left[\frac{\left(\frac{-Vdc}{2} - Vf\right) \times (1+M')}{2}\right] + Verror \quad \text{(Equation 2)}$$

Vce is the IGBT on-state voltage drop, Vf is diode on-state voltage drop, and Verror is the equivalent average voltage error due to commutation.

So, when the current is positive, M' could be calculated as, $$M' = \frac{M \times Vdc + Vce + Vf - 2 \times Verror}{Vdc - Vce + Vf} \quad \text{(Equation 3)}$$

When the current is negative, M' should be $$M' = \frac{M \times Vdc - Vce - Vf - 2 \times Verror}{Vdc - Vce + Vf} \quad \text{(Equation 4)}$$

Vce and Vf data can be extracted from the relevant data sheet while Verror is the equivalent average voltage during the task period calculated as the total volt-second error caused by commutations during that particular task period divided by the task period. The task period is the period when the software and the compensation are executed. For fixed switching frequency application, the task period is normally either the half of switching period or full switching period.

The hardware implementation can be based on DSP, MCU, FPGA and CPU, etc depending on the particular converter design. SWP 3 MW PU's controller is based on an industrial PC.

Both laboratory and wind-turbine site tests have shown that, when one SWP version 2 module is coupled in parallel with four version 1 modules in one SWP 3 MW power unit, the mis-share current can been successfully limited within a 3% range. As mentioned in the background section, the mis-share current would normally be around 15% in such a case.

Figure 6:
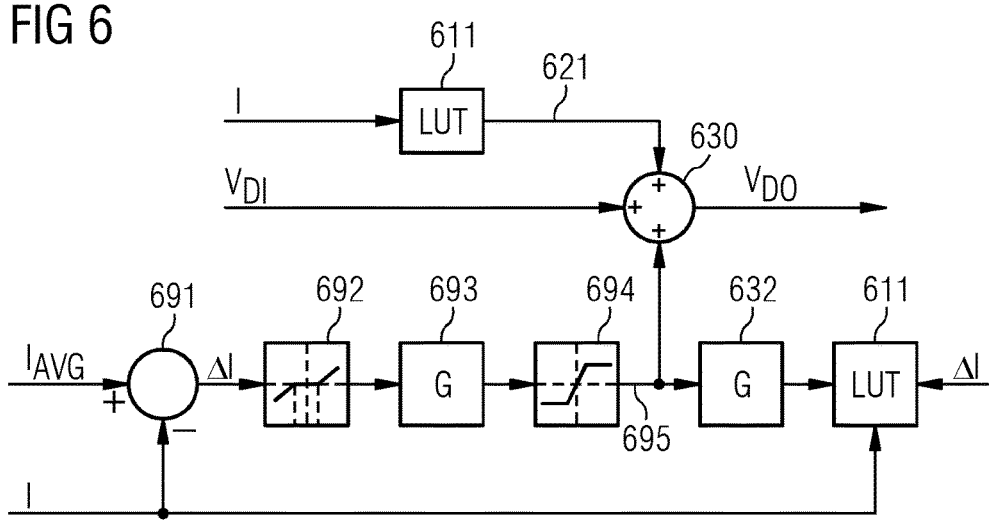
FIG. 6 shows a block diagram of a converter module controller in accordance with an embodiment of the present invention.

FIG. 6 shows a block diagram of a converter module controller in accordance with an embodiment of the present invention. In this embodiment, the feed-forward compensation is implemented as a look-up table (LUT) 611 which contains converter module specific compensation data as a function of phase current I, such that a compensation value 621 can be added $V_{DI}$ by adder 630 to generate $V_{DO}$. A further feature of this embodiment is that the look-up table is generated and maintained online, i.e. during operation of the converter. That is, the compensation values 695 generated by the closed-loop system are, after application of a gain in unit 632, stored in the look-up table 611 as a function of phase current I.

The build up of the look-up table 611 is basically a recursive procedure. Before the first start of the converter, without any information of the non-linearity characteristics, the data are initialised as zero values or seed values based on previous operations of similar converter equipment. The data building is started only when the system current is more than certain levels. This is because perfect current balance is not required at low current range and the accuracy cannot be guaranteed.

Another consideration of low current compensation is the size of the look up table. An evenly distributed current array requires huge memory space especially when sufficient low current points are needed. Having a non-uniform sampling of current may optimise the size of the look up table such as higher data density at low current range. A trade-off between low current sharing performance and the size of the look-up table 611 may have to be made.

When the converter is started up for the first time, the active sharing generates a phase voltage demand correction 695 every half or full switching period. This information will be multiplied by a gain in unit 632 and then inserted into the look-up table 611. A gain of less than unity may be required to ensure the stability of the whole recursive procedure, especially when the closed-loop active sharing algorithm has a high gain.

When the phase current I reaches a similar level later during operation, the look-up table 611 is searched and the matching data is applied as compensation value 621.

After each step, there is more feed-forward compensation and less current error. A few recursive steps later the mis-share current is less than a predefined level and the look-up table update will be terminated.

If later on, the mis-share current exceeds the predefined range again, it is an indication that the data in look-up table 611 are not suitable for the corresponding operating conditions. Therefore, the data update will be invoked again. This data can be retained in non-volatile memory and used when the converter system is turned on the next time. If the mis-share current does not converge, the gain applied to the look up table must be adjusted.

The look-up table 611 has to compensate both the switching related errors and the on-state voltage drop. The on-state voltage drop's impact on the system output voltage is dependent on the device on-period or, in other words, on phase voltage demand $V_{DI}$ or instantaneous modulation depth and current I. When the operating conditions are changed, the instantaneous phase voltage demand and the current relationship are changed so the already built-in current indexed look-up table 611 may not be valid any more. Hence the look-up table has to be updated constantly and every time the operating condition changes.

Figure 7:
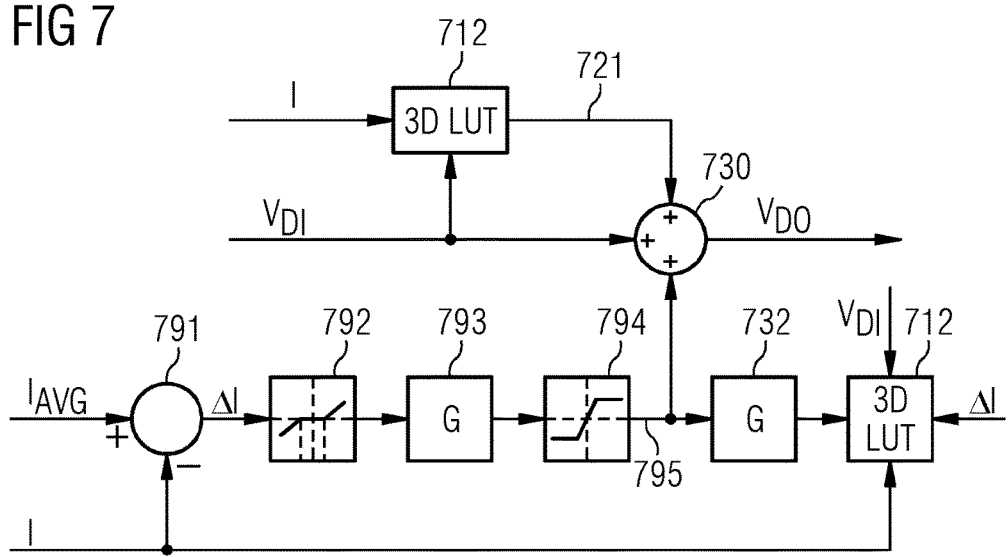
FIG. 7 shows a block diagram of a converter module controller in accordance with an embodiment of the present invention.

FIG. 7 shows a block diagram of a converter module controller in accordance with an embodiment of the present invention that overcomes the above-mentioned problem by using a 3D look-up table 712 in which the data is indexed both with regard to $V_{DI}$ and I. Apart from this, the remaining elements of this embodiment correspond to those of the embodiment shown in FIG. 6, such that a repeated description of these elements is omitted for reasons of brevity.

In the embodiment of FIG. 7, the critical dependant factors for both switching related errors and on-state voltage drop are considered in the 3D look-up table 712. Accordingly, the 3D look-up table 712 may require more memory than the 2D look-up table 611 of FIG. 6, but provide the benefit of a reduced need for updating of the data during operation.

Figure 8:
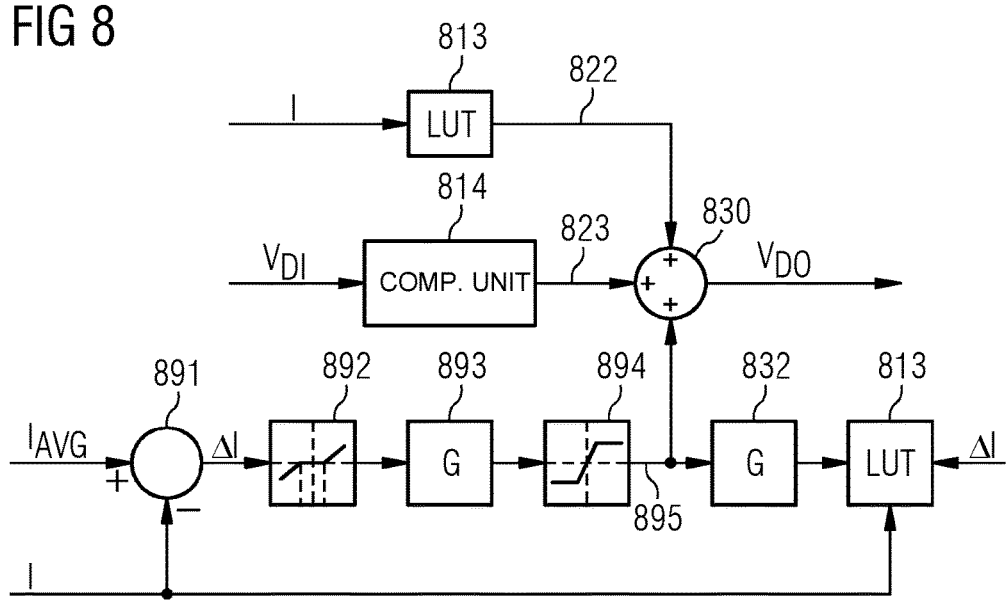
FIG. 8 shows a block diagram of a converter module controller in accordance with an embodiment of the present invention.

FIG. 8 shows a block diagram of a converter module controller in accordance with an embodiment of the present invention. In this embodiment, a separate compensation unit 814 is added for dealing with the on-state voltage drop compensation by generating a corresponding compensation value 823, while the look-up table 813 is used to provide a compensation value 822 that takes care of the switching-related errors, which are only relevant to the current levels.

In summary, the embodiments shown in FIGS. 6 to 8 present three solutions relying on look-up tables that are populated and maintained online: (i) 2D look-up table 611 with current I as index, (ii) 3D look-up table 712 with both current I and phase voltage demand $V_{DI}$ as index, and (iii) 2D look-up table 813 with separate on-state voltage drop compensation 814. The size of the LUT can be minimised by using an interpolator function to determine intermediate values not supported by the LUT.

Generally, the solutions can be implemented on DSP, MCU, FPGA and CPU, etc depending on the converter manufacturer's design and preferences.

The present invention provides the flexibility of using two or more parallel converter modules having different types of semiconductors without massive mis-share current. In other word, converter modules from different development stages can easily be made compatible with each other.

This has long term benefits in terms of spares holdings—a later evolution of the converter module can be operated in parallel with earlier evolutions without compromise to load current ratings.

Furthermore, the compensation scheme opens up the opportunity for multi-sourcing of semiconductors and/or gate drivers into the supply chain, where any resulting command to output voltage transfer function variances can be accommodated by the on-line tuned look up table. Thus, it is flexible and adaptive, and does not require extra data acquisition of the specific converter non-linearity characteristics.

It is explicitly noted that although the above embodiments have been described in connection with wind power applications, the principles of the feed-forward compensation is equally applicable to other industrial applications involving a plurality of converter modules coupled in parallel.

Furthermore, the feed-forward compensation is equally applicable to converter modules that serve to convert DC voltage into AC voltages or AC voltages into DC voltage, and for both generation and motoring of power flow.

It is noted that the term "comprising" does not exclude other elements or steps and the use of the articles "a" or "an" does not exclude a plurality. Also elements described in association with different embodiments may be combined. It is further noted that reference signs in the claims are not to be construed as limiting the scope of the claims.

The invention claimed is:

1. A method of controlling a power unit comprising a plurality of converter modules coupled in parallel, each converter module being configured to convert a DC voltage into AC voltages or AC voltages into a DC voltage, the method comprising
- receiving a control value for each phase of each converter module,
- obtaining a set of phase current values for each converter module,
- generating a compensation value for each phase of each converter module based on the set of phase current values and a set of data stored in a memory, the set of data being representative of non-linearity characteristics of the converter modules as functions of phase current value,
- generating a compensated control value for each phase of each converter module based on the corresponding control value and the corresponding compensation value, and
- supplying the compensated control values to the respective converter modules.

2. The method according to claim 1,
wherein the set of data is representative of non-linearity characteristics of the converter modules as functions of phase current value and control value, and
wherein generating the compensation value for each phase of each converter module is further based on the set of phase current values.

3. The method according to claim 1,
wherein the set of data is stored in a look-up table or as a set of curve-fitted equations.

4. The method according to claim 1,
wherein the set of data is obtained from test data.

5. The method according to claim 1,
wherein the set of data is obtained and/or updated during operation of the power unit.

6. The method according to claim 5,
wherein the set of data is obtained and/or updated by, for each phase of each converter module, calculating a feedback current error and a corresponding control value compensation value, and storing the calculated control value compensation value together with the corresponding phase current value.

7. The method according to claim 1,
wherein the non-linearity characteristics of the converter modules comprise switching-related errors and/or on-state voltage drops relating to semiconductor components in the converter modules.

8. A controller for a power unit comprising a plurality of converter modules coupled in parallel, each converter module being configured to convert a DC voltage into AC voltages or AC voltages into a DC voltage, the controller comprising
- a unit for receiving a control value for each phase of each converter module,
- a unit for obtaining a set of phase current values for each converter module,
- a unit for generating a compensation value for each phase of each converter module based on the set of phase current values and a set of data stored in a memory, the set of data being representative of non-linearity characteristics of the converter modules as functions of phase current value,
- a unit for generating a compensated control value for each phase of each converter module based on the corresponding control value and the corresponding compensation value, and
- a unit for transmitting the compensated control values to the respective converter modules.

9. A power unit for a wind turbine generator, the power unit comprising
- a plurality of converter modules coupled in parallel, each converter module being configured to convert a DC voltage into AC voltages or AC voltages into a DC voltage, and
- a controller according to claim 8.

10. A wind turbine comprising a power unit according to claim 9.

11. A computer program stored in memory of a controller for a power unit comprising
- computer executable instructions adapted to, when executed by a computer processing unit, cause the computer to perform the method according to claim 1.

12. A computer program product comprising
- a non-transitory computer readable media loaded with a computer program comprising computer executable instructions adapted to, when executed by a computer processing unit, cause the computer to perform the method according to claim 1.

\* \* \* \* \*